United States Patent [19]

Weller et al.

[11] Patent Number: 4,883,085

[45] Date of Patent: Nov. 28, 1989

[54] METHOD OF INSTALLING A STOPPER IN A FITTING AND APPARATUS THEREFOR

[75] Inventors: Michael E. Weller, House Springs, Mo.; Joseph L. Daghe, Decatur, Ill.

[73] Assignee: Mueller Company, Decatur, Ill.

[21] Appl. No.: 244,297

[22] Filed: Sep. 15, 1988

[51] Int. Cl.[4] .................. F16K 43/00; F16L 55/12
[52] U.S. Cl. ................... 137/315; 137/318; 137/321; 138/94; 138/97; 403/320; 411/204; 411/262
[58] Field of Search ............... 137/315, 317, 318, 319, 137/320, 321; 138/89, 94, 97; 403/320, 343; 411/204, 262, 511, 512

[56] References Cited

U.S. PATENT DOCUMENTS

| 535,614 | 3/1895 | Corey | 138/94 |
|---|---|---|---|
| 804,185 | 11/1905 | Davison | |
| 972,384 | 10/1910 | Kellar | 137/321 |
| 983,268 | 2/1911 | Corey | 138/94 |
| 1,840,187 | 1/1932 | Davis | |
| 1,887,542 | 11/1932 | Carr | |
| 1,987,239 | 1/1935 | Lochrane | 411/262 |
| 2,237,476 | 4/1941 | Cline | 137/318 |
| 2,664,262 | 12/1953 | Mueller et al. | 137/315 |
| 2,790,571 | 4/1957 | Flaith et al. | 137/321 |
| 2,812,778 | 11/1957 | Ver Nooy | 138/94 |
| 2,906,295 | 9/1959 | Ver Nooy | 138/94 |
| 2,992,685 | 7/1961 | Madsen | 411/262 |
| 3,543,802 | 12/1970 | Leopold et al. | 138/94 |
| 3,774,647 | 11/1973 | Saha | 138/94 |
| 3,799,182 | 3/1974 | Long | 137/318 |
| 3,904,301 | 9/1975 | Schroeder | 403/259 |
| 3,912,411 | 10/1975 | Moffat | 403/259 |
| 3,971,575 | 7/1976 | Lesham et al. | 285/85 |
| 4,064,912 | 12/1977 | Petrone | 138/94 |
| 4,127,141 | 11/1978 | Ledonne et al. | 137/318 |
| 4,202,377 | 5/1980 | Harrison | 138/94 |
| 4,253,485 | 3/1981 | Legille | 137/315 |
| 4,491,145 | 1/1985 | Williams | 137/315 |
| 4,515,177 | 5/1985 | Thalmann et al. | 137/318 |

Primary Examiner—George L. Walton
Attorney, Agent, or Firm—Cushman, Darby & Cushman

[57] ABSTRACT

A method and apparatus for installing a plastic fitting and a line stopping mechanism to a main includes a stopper shaft which is used to remove a completion plug in the fitting during installation, and to control the line stopper mechanism once it is installed within the fitting; a connection between the stopper shaft and an external drive shaft is provided which includes both left and righthanded threads in order to prevent the connection from loosening while it is being torqued in different directions. A method of installing the fitting which includes electric resistance fusing is also disclosed.

16 Claims, 6 Drawing Sheets

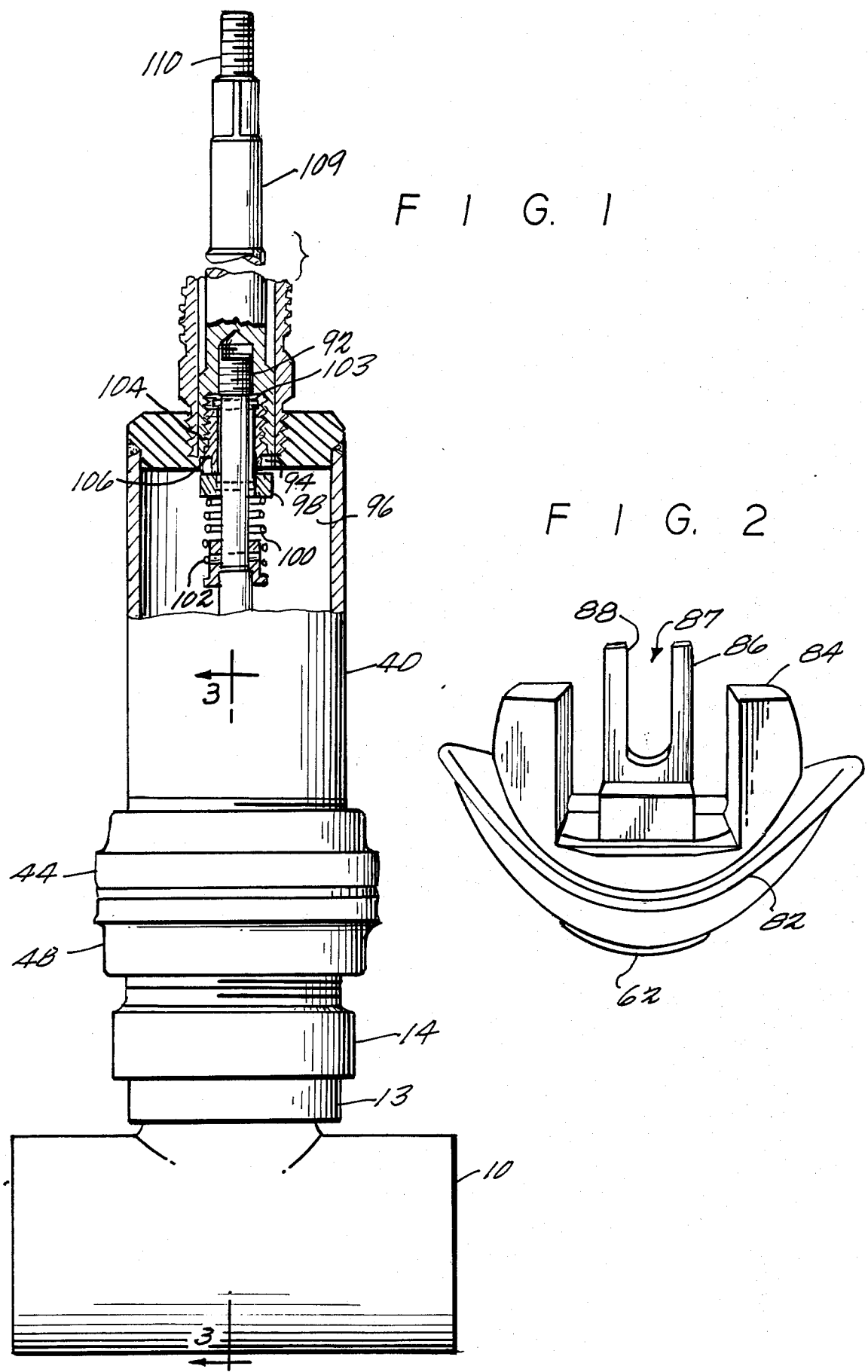

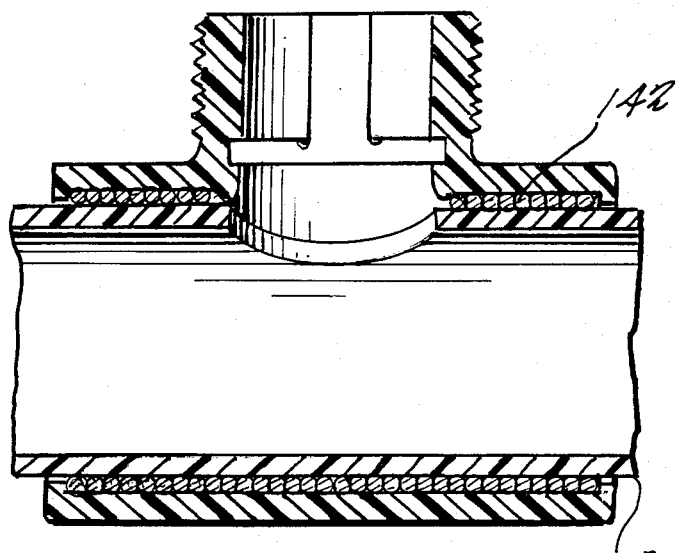
FIG. 10
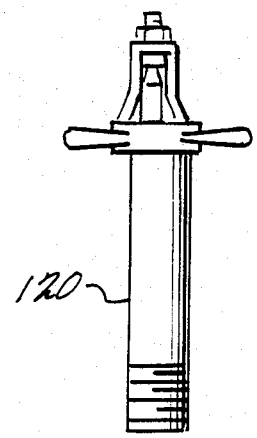
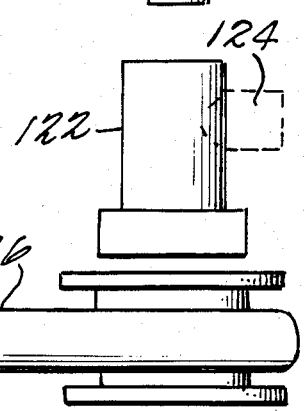
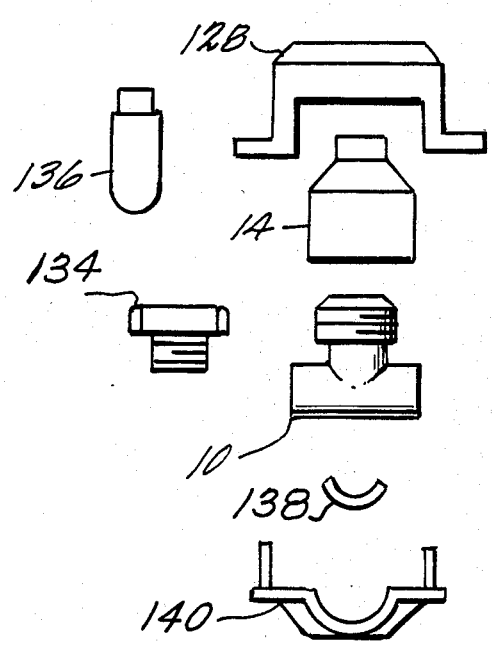
FIG. 9

METHOD OF INSTALLING A STOPPER IN A FITTING AND APPARATUS THEREFOR

BACKGROUND OF THE INVENTION

1. Field of the Invention

The present invention relates to a method for installing a stopper mechanism in a plastic fitting which is connected to a water main or the like, and an apparatus for accomplishing the same. Specifically, the apparatus of the present invention relates to an improved connector arrangement between a stopper control shaft and an external drive shaft, and to a new and improved stopper mechanism. The present invention further relates to a new and improved process for installing a plastic fitting and stopper therefor onto an existing water main or the like.

2. Description of the Prior Art

Pipes which are made out of PE, PVC and ABS plastic resins are commonly used to carry water and other noncorrosive liquids for both industrial and residential applications. In order to control the flow of fluids or gases through such pipes, it has been known to provide closure devices which are adapted for installation onto a existing pipe. Such closure devices are especially useful for controlling a break in the pipeline, or for installing branch lines to the main.

In order to install such a closure device, a fitting piece having an opening therein is secured to the desired section of pipe, and a drilling machine can be used to cut through the pipe beneath the opening in the fitting. A completion cap or plug may be provided in the fitting to seal the opening therein when it is not desired to use the closure device. When a closure device is inserted into the opening and within the pipe, a control or stopper shaft extends through the opening to control the position of the closure mechanism within the pipe. Various arrangements have been used to connect and/or disconnect the completion plug from the opening in the fitting.

One problem which has existed in relation to such prior art devices arises from the difficulty in gaining access to pipe sections which are buried far underground, or in other remote locations. In such instances, it was often difficult to perform the tasks of installing the fitting, removing the completion plug from the fitting and installing or removing the closure mechanism from within the fitting. Indeed, it might have been necessary to use separate elongated tools to perform each function.

Another disadvantage of such prior art devices was that the connection between the stopper shaft and an external drive mechanism would occasionally come loose or unscrew because of the relative and shifting torque therebetween.

From the above, it is clear that there has existed a long and unfilled need in the prior art for a stopper system and method for stopping plastic pipes which would solve the above discussed problems resulting from the inaccessability of remote pipes, and the problems which have existed in prior art connections between the stopper shafts of such assemblies and external drive mechanisms.

SUMMARY OF THE INVENTION

Accordingly, it is an object of the present invention to provide an improved apparatus for removing and installing a stopper mechanism and fitting therefor in a plastic pipe. It is further an object of the present invention to provide a method of installing a line stopping system within a fitting that is attached to a pressurized main, and is sealed with a completion plug.

Included in the apparatus of the present invention is a stopper shaft having structure on a lower end thereof for either engaging a completion plug or engaging and controlling a stopper valve assembly, the stopper shaft having a nipple which is threaded in a first direction at an upper end thereof and adapted to engage a threaded bore in a boring bar of a drilling machine or the like, a lock nut mounted on the stopper beneath the nipple and having an outer threaded portion which is threaded in a second direction that is opposite to the first direction so as to be adapted to engage an inner threaded portion that is provided within a flange on the boring bar, and structure for releasably locking the stopper shaft against rotation with respect to the lock nut, whereby torque in either direction between the boring bar and the stopping shaft will cause one of the threaded connections to tighten, and provide for easy disassembly of the connection by disengaging the locking structure.

According to the method of the present invention, a fitting adaptor is attached to external threads which are provided on the fitting, a holding frame is attached over the adapter and onto the fitting, the completion plug is removed from the fitting with a stopper shaft, the completion plug is subsequently removed from the stopper shaft, a line stopper mechanism is secured to the stopper shaft and the stopper mechanism and stopper shaft are inserted into the fitting in order to control the flow of fluid therethrough, with the stopper shaft acting as a control shaft.

It is clear that using the stopper shaft to both remove or install the completion plug to the fitting and to control the stopper mechanism greatly simplifies the installation of the line stopper mechanism of the present invention over prior art devices. Further, the connection that is provided in the present invention between the stopper shaft and the boring bar of a drilling machine or the like will greatly reduce the likelihood of the two shafts coming apart due to torque related loosening of the connection.

Other objects, features, and characteristics of the present invention, as well as the methods and operation and functions of the related elements of the structure, and to the combination of parts and economies of manufacture, will become apparent upon consideration of the following description and the dependent claims with reference to the accompanying drawings, all of which former part of the specification, wherein like reference numerals designate corresponding parts in the various Figures.

BRIEF DESCRIPTION OF THE DRAWINGS

FIG. 1 is a side elevational view partially in cross-section of the line stopper assembly of the present invention installed on a plastic pipe;

FIG. 2 is a perspective view of one component of the line stopper assembly of the present invention;

FIG. 9 is an exploded view of the equipment which is used to install the line stopping assembly of the present invention onto a preselected section of plastic pipe; and FIG. 10 is a cross-sectional view of an electrofusion tee which may be used according to one embodiment of the present invention.

DETAILED DESCRIPTION OF THE PREFERRED EMBODIMENT

Figure 3:
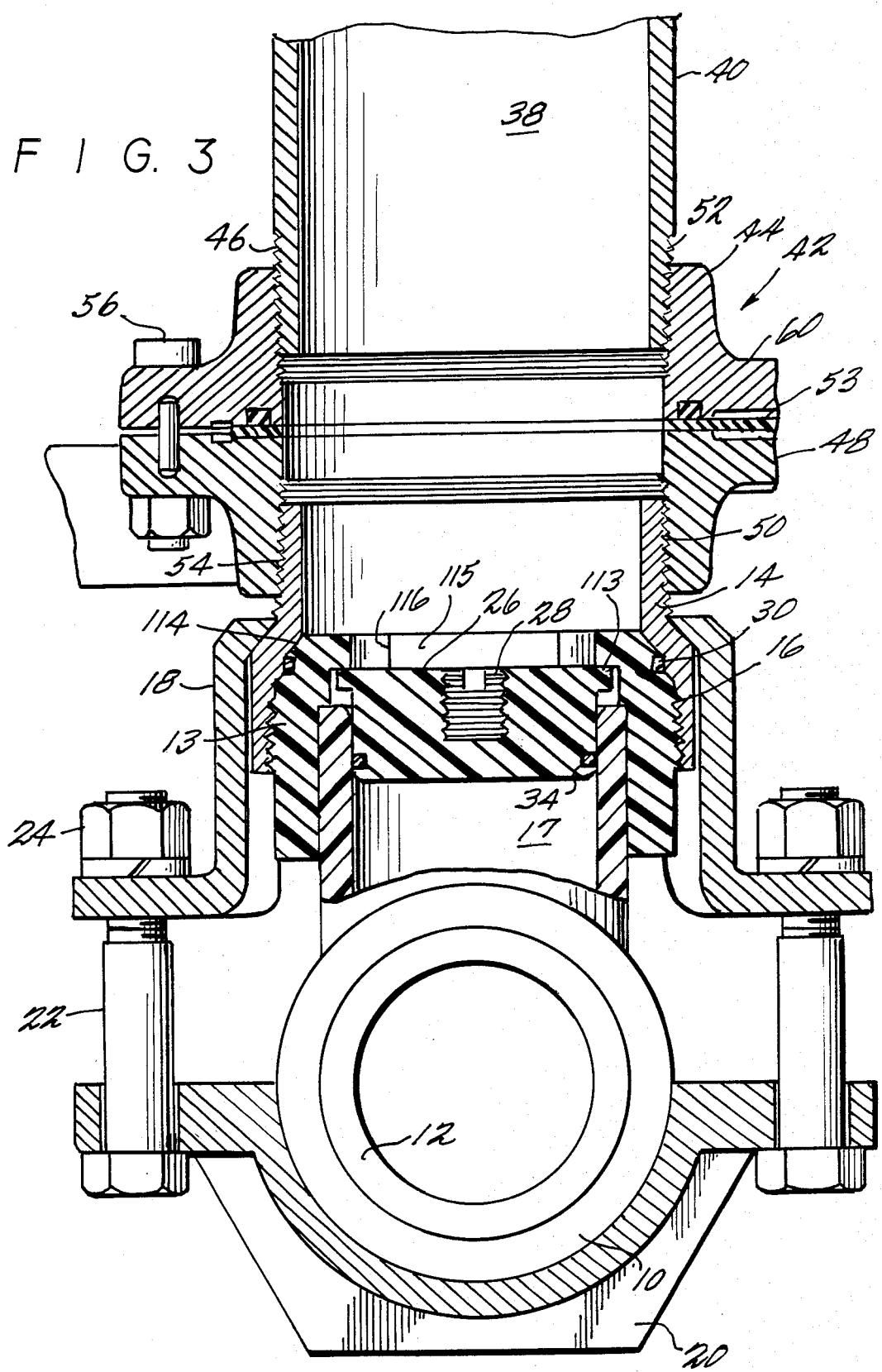
FIG. 3 is a cross-sectional view of a lower portion of the line stopper assembly shown in its plugged position.
Figure 4:
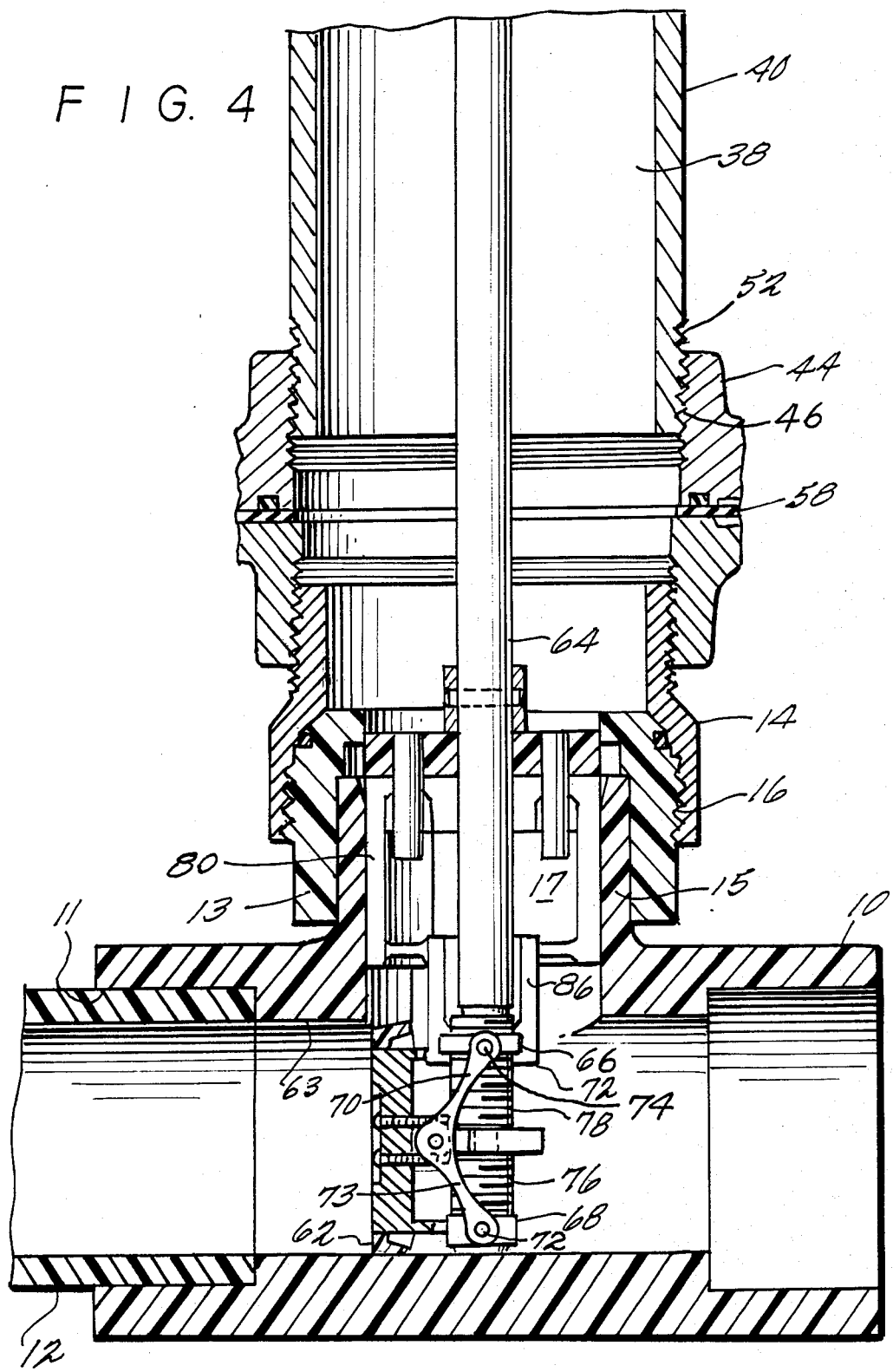
FIG. 4 is a cross-sectional view of the lower portion of the line stopper assembly of the present invention with the line stopper mechanism shown installed.

Referring to FIGS. 1, 3 and 4, a line stopping mechanism constructed according to the present invention is adapted to be positioned within a fitting 10 having sockets 11 in which a main 12 may be received. Fitting or tee 10 is preferably formed of plastic, such as polyethylene but often a plastic of the PVC or ABS resin type is used. As shown in FIG. 4, fitting 10 is provided with an upstanding portion 15 in which an access hole 17 is defined. A fitting adaptor 13 is factory joined to the upstanding part 15 of the fitting 10 to produce an assembly for field installation. External outer threads 16 are provided around the periphery of fitting adapter 13.

As also shown in FIGS. 1, 3 and 4, an adaptor 14 is threadedly engaged to the external threads 16 of the fitting adapter 13. As shown in FIG. 3, a holding frame having a top half 18 and a bottom half 20 is provided to support for the fitting during shut-off operations. The top half and bottom half 18, 20 respectively of the holding frame are secured together by means of a pair of bolts 22 and nuts 24, as is shown in FIG. 3.

Figure 6:
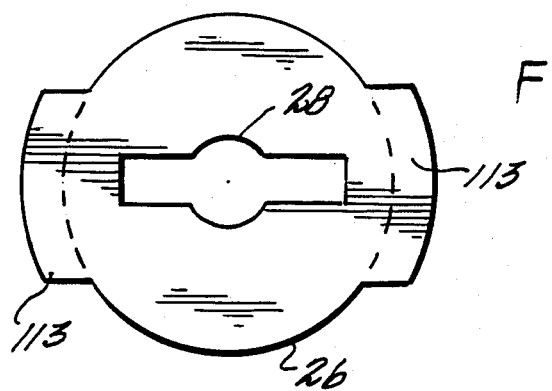
FIG. 6 is a top plan view of the completion plug of the present invention.
Figure 7:
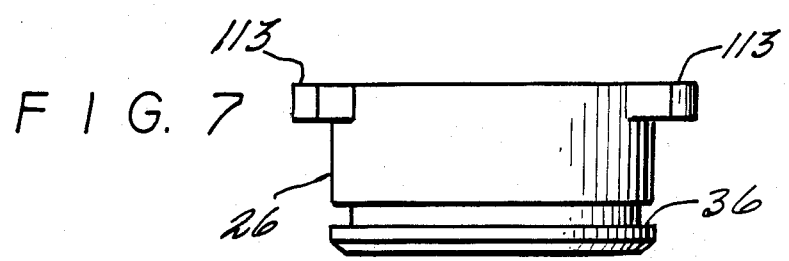
FIG. 7 is a side elevational view of the completion plug illustrated in FIG. 6.
Figure 8:
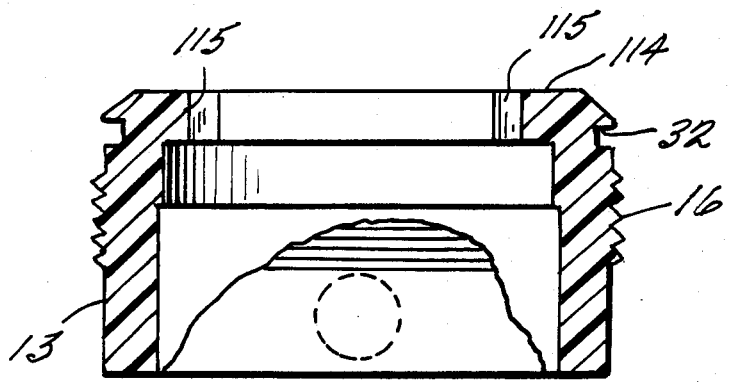
FIG. 8 is a cross-sectional view of a fitting adapter which is used in the present invention.

When it is desired to stop the flow of liquid within the main 12 and fitting 10, a completion plug 26 may be installed within the access hole 17, as is shown in FIG. 3, to seal off the access hole and the upstanding portion 15 of fitting 10. Completion plug 26 is preferably provided with a threaded hole 28 defined in an upper surface thereof, as is clearly shown in FIGS. 3 and 6. FIGS. 6 and 7 provide a top and side view, respectively, of the completion plug 26. As is illustrated in FIG. 7, a circumferential recess 36 is provided in the completion plug to accommodate an O-ring 34 for purposes for sealing against the surface of fitting 10 which defines the access hole 17. O-ring 34 is illustrated in FIG. 3 in its position within its circumferential groove 36. A circumferential groove 32 is also defined within an upper surface of the fitting adapter of the fitting 10, to accommodate an O-ring 30, which is also illustrated in FIG. 3. A detailed view of the fitting adapter 13 of fitting 10 is provided in FIG. 8, along with the external threads 16 and circumferential recess 32.

For providing access to a main and fitting which are buried underground or are positioned in a similarly difficult to reach location, a control chamber 38 defined by an access pipe 40 is attached to an upper portion of adaptor 14 by a threaded connector member control valve 42. As shown in FIG. 3, control valve 42 includes a top section 44 having inner threads 46 defined therein, and a bottom section 48 in which inner threads 50 are defined. In order to connect access pipe 40 to the valve adaptor 14, inner threads 50 of bottom section 48 are threaded onto outer threads 54 which are formed on a top portion of the adaptor 14, and a lower outer threaded portion 52 of the access pipe 40 is threaded into the inner threads 46 in the top section 44 of the connector member, as is shown in FIG. 3. Fasteners 56 are provided to secure the top and bottom sections 44, 48 and slide gate 56 of the connector member together. An O-ring 60 is provided between the top and bottom members 44, 48 to seal the control chamber 38 from the access hole 17.

FIG. 4 illustrates the specific line stopper valve assembly which is used according to the preferred embodiment of the present invention. As shown in FIG. 4, the stopper valve assembly includes a cup shaped seal stopper 62 is provided within the fitting 10 for sealingly engaging an inner surface 63 of the fitting. A stopper shaft 64 extends downwardly through access pipe 40, fitting adaptor 14, control valve 42, and the access hole 17 where it terminates in a lower portion having a left handed threaded portion 78 defined therein and a right handed threaded portion 76 defined at the very bottom of the stopper shaft 64 beneath the left handed threaded portion 78. As shown in FIG. 4, the left handed threaded portion 78 may have a larger outer threaded diameter than the right handed threaded portion 76.

In order to connect the cup-shaped seal stopper 62 to stopper shaft 64, a first threaded collar 68 which is on the lower threaded portion of an alignment centering guide 80 is provided so as to be threadedly engaged upon the left hand threaded portion 78 of the stopper shaft 64. A second threaded collar 68 is threadedly engaged upon the right hand threaded portion of the stopper shaft, as is illustrated in FIG. 4. A first draw bar linkage 70 is attached to the first threaded collar 68 by a first pivot pin 72, and a second draw bar linkage 73 is attached to the second threaded collar 68 by a second pivot pin 74. As a result of this construction, the cup seal stopper member 62 is caused to move toward surface 63 where 63 is the interior surface of conduit 10, when the stopper shaft 64 is rotated in a first direction, and away from the surface 63 when stopper shaft 64 is rotated in a second, opposite direction.

In order to ensure that the cup seal stopper 62 is perfectly centered with respect to surface 63 within the fitting, the alignment centering guide 80 having a centering bore therein is located above the threaded portions 78, 76 on stopper shaft 64, as is shown in FIG. 4. The alignment centering guide co-operates with the body projections 116 to prevent rotation of the stopper assembly within the fitting 10.

FIG. 2 is a detailed perspective view of the cup seal stopper member 62. A sealing gasket portion 82 is provided for engagement with surface 63 within the fitting, and is securely mounted upon a support body 84, as shown in FIG. 2. When the cup seal stopper member is mounted within the fitting as part of the stopper assembly, a slide portion 86 extends rearwardly toward the stopper shaft 64. As shown in FIG. 2, slide portion 86 has a recess 87 defined therein by a pair of flat surfaces 88. Flat surfaces 88 engage the alignment centering portion of stopper shaft 64 in order to ensure that cup seal stopper 62 slides forwardly in alignment with the inner walls of fitting 10.

Figure 5:
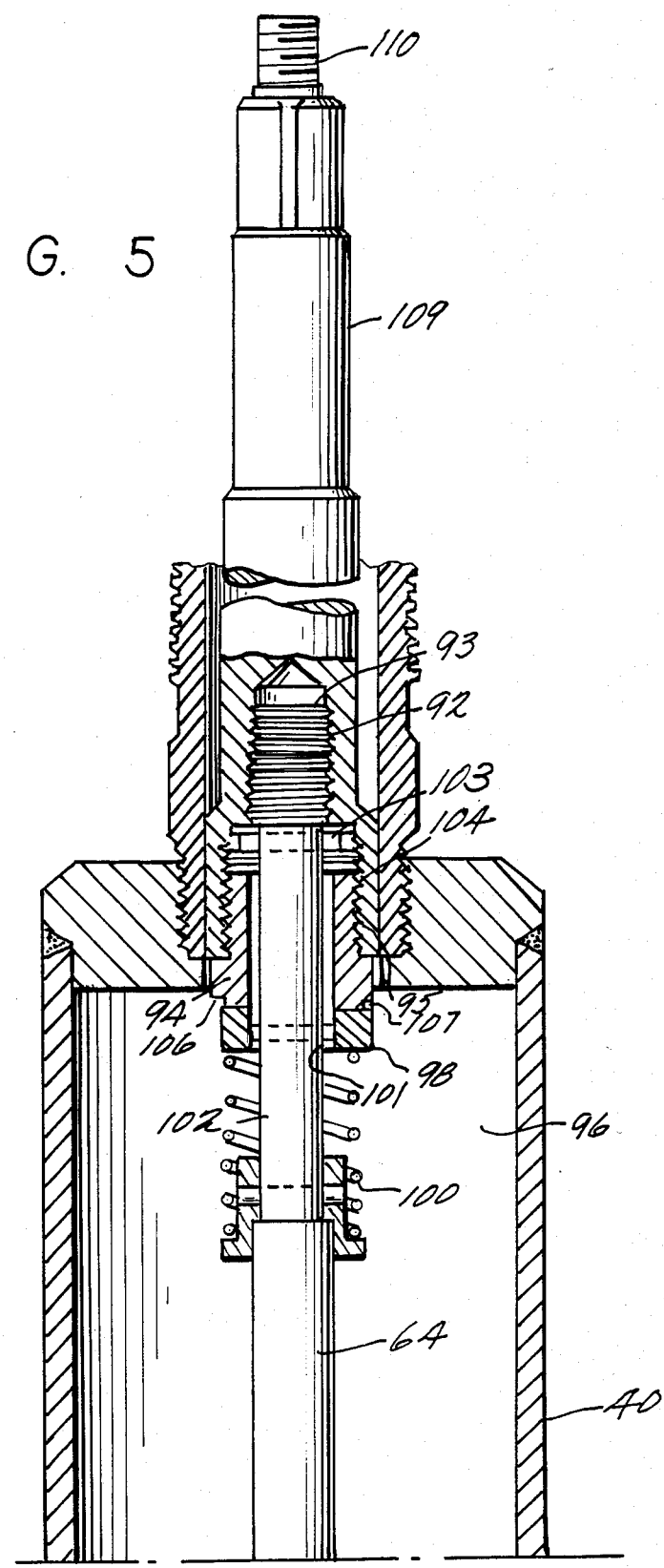
FIG. 5 is a detailed view partially in cross-section of the shaft connecting arrangement which is used in the present invention.

FIG. 5 is a detailed view of an upper portion of the access pipe 40 and stopper shaft 64, where the stopper shaft 64 is connected to an external drive mechanism. As shown in FIG. 5, stopper shaft 64 is provided with an upper threaded portion 92 having a left handed thread defined therein. A drive shaft connection mechanism 96 is provided to secure stopper shaft 64 against rotation with respect to a boring bar or drive shaft 109 which may be powered by an external source such as a handle or drilling machine. Left handed threaded upper portion 92 of the stopper shaft 64 is threadedly engaged with a threaded bore 93 that is defined in a lower portion of boring bar 109. Beneath the portion of boring bar 109 in which the threaded recess 93 is defined, an outer flange portion 103 is provided which has a right hand thread 104 defined in an internal surface thereof. A lock nut 94 is provided on the upper portion of stopper shaft 64, and has an external right hand thread 95 defined therein for engagement with threads 104 on flange portion 103 of the boring bar 109. Lock nut 94 is further provided with at least one downward projection 106, as is shown in FIG. 5. A lock collar member 98 is provided upon stopper shaft 64 immediately beneath the lock nut 94, as is shown in FIG. 5. Collar 98 is provided with inner surfaces 101 which ride against flat portions 102 that are defined upon the boring bar 64, which locks the collar 98 against rotation with respect to boring bar 64. As is further shown in FIG. 5, at least one upwardly extending tang 107 is provided upon the collar 98 for engagement with the downward projection 106 on lock nut 94. A spring 100 is provided to bias the collar 98 and tangs 107 towards the lock nut 94 and its downward projection 106 as is shown in FIG. 5.

As a result of this novel construction, one of the threaded connections 92, 93 or 104, 95 are tightened regardless of which way the boring bar 109 is torqued relative to stopper shaft 64. Accordingly, torque related loosening of the connection between the two shafts 109, 64 is prevented. A further advantage of the connection assembly of the present invention is its relative ease of disassembly. In order to take the connection apart, an operator need only to push collar 98 downwardly against the bias of spring 100 and unscrew lock nut 94 from the flange portion 103 of the boring bar 109. The upper threaded portion 92 may then be conveniently unscrewed from the boring bar, thus allowing removal of boring bar 109 from the line stopper assembly.

In the embodiment illustrated in FIG. 1, boring bar 109 is provided with a threaded nipple portion 110 at a top end thereof to which a control handle (not shown) may be attached. The control handle may be turned in order to torque a feed sleeve of conventional construction with respect to the stopper shaft 64 (FIG. 4).

FIG. 9 illustrates the equipment which may be used to install a fitting and line stopper assembly according to the present invention onto a plastic main. This assembly includes a drilling machine 120, a drilling machine adapter 122 having a bypass 124, a gate or control valve 126, and a holding frame including a top clamp half 128 and a bottom cradle half 140. Illustrated also is a fitting 132 of a second type adapted to be placed upon an existing main 10. A plug 134 and stopper 136 are also illustrated separately in FIG. 9. A spacer 138 may also be provided to maintain proper spacing between the main 10 and the cradle 140 during clamping with the holding frame. Spacer 138 may be bonded to the main at the same time the top clamp half 128 is joined to the main.

The method of installing a line stopping system with the present invention will now be described. In the case of the type of fitting which is illustrated in FIG. 9, the fitting is first placed upon the main in the position to which it is desired to be attached. The top and bottom halves of the fitting are then tightly secured to the main by fusion bonding. Fusion bonding can be accomplished by the use of specially shaped heated plates, or by fusing the top and bottom halves of the fitting to the main by electric resistance heating, according to the configuration which is illustrated in FIG. 10. According to latter solution, a number of electric resistance elements 142 are provided between the fitting portions and the main; which, when an electric current is passed through them, act to melt the adjacent surfaces of the two elements so that they may fuse together.

After the fitting has been attached to the main, the valve adaptor 14 is threaded onto the top half of the fitting, and to the position shown in FIG. 4. Once this is accomplished, the stopper shaft 64 may be lowered to engage the completion plug 26, which is removed by rotating it 90 degrees so that tabs 113 are withdrawable through the recesses 115 provided in body flange 114 of the fitting adapter 13. The completion plug 26 may be withdrawn through the adaptor 14, the control valve 43 and the access pipe 40. Once the shaft 64 has been withdrawn, the control valve 42 can be closed, the drilling machine 120 can be removed and the completion plug 26 can be removed from the stopper shaft 64. Up until this time, the control valve 42 may be attached to an upper portion of the adapter 14, to control any fluid which may pass therethrough due to pressurization of the main. At this time, the drilling machine 120 may be positioned above control valve 126 and centered with respect thereto by the adapter 122. Drilling machine 120 may be lowered through the fitting adapter 13, valve adapter 14, the fitting 132 and through upstanding portion 15 to drill a hole in the main immediately beneath the opening in the fitting 132. Once the hole has been drilled and drilling machine 120 has been withdrawn above the control valve 126, the adapter 122 may be removed from control valve 126.

Before the drilling machine is completely removed, control valve 126 is closed in order to prevent escape of fluid from the main. After the drilling machine is completely removed the stopper mechanism may be attached to the stopper shaft.

Stopper shaft 64 is secured to boring bar or other external drive shaft 109 as shown in FIGS. 1 and 5. To accomplish this, the upper threaded portion 92 of the stopper shaft is first threaded into the threaded recess 93 of the boring bar 109. The lock nut 94 is then threaded into the inner threads 104 which are provided in the flange portion 103 of the boring bar 109. Collar 98 is then positioned so that its tangs 107 engage the projection 106 on lock nut 94, thereby securing the lock nut against rotation with respect to the stopper shaft. In this way, a connection is achieved that would not loosen due to torque between the two shafts in either direction.

The stopper mechanism in stopper shaft may then be lowered downwardly into the fitting and the main to the position which is shown in FIG. 4.

When it is desired to disconnect boring bar 109 from stopper shaft 64, collar 98 is manually pushed downwardly, allowing the lock nut 94 to be unscrewed from the flange portion 103 of the boring bar. The upper threaded portion 92 may then be unscrewed from the recess 93 of the boring bar, and the boring bar may then be moved.

While the invention has been described in connection with what is presently considered to be the most practically and preferred embodiment, it is to be understood that the invention is not limited to the disclosed embodiment, but, on the contrary, is intended to cover various modifications and equivalent arrangements included within spirit and scope of the appended claims.

What is claimed is:

1. An improved apparatus for removing and installing a completion plug and a stopper valve assembly relative to a fitting in a plastic line and for controlling the stopper valve assembly within the fitting, comprising:
a stopper shaft having means on a lower end thereof for either engaging a completion plug or engaging and controlling said stopper valve assembly, said stopper shaft having a nipple which is threaded in a first direction at an upper end thereof and adapted to engage a threaded bore in a boring bar of a tool device;
a lock nut mounted on said stopper shaft beneath said nipple and having an outer threaded portion which is threaded in a second direction that is opposite to the first direction so s to be adapted to engage an inner threaded portion that is provided within a flange on the boring bar; and
means for releasably locking said stopper shaft against rotation with respect to said lock nut, whereby torque in either direction between the boring bar and the stopper shaft will cause one of the threaded connections to tighten, and the threaded portions may be disassembled by disengaging the locking means when the locking means is pushed away from the locking nut to permit the boring bar to be unscrewed and removed from the stopper shaft.

2. Apparatus according to claim 1, further comprising means for limiting rotation of said stopper shaft with respect to the boring bar.

3. Apparatus according to claim 1, wherein said releasable locking means comprises at least one projection formed at a lower surface of said lock nut, a collar member that is secured against rotation with respect to said stopper shaft and has at least one upwardly extending tang for engaging said projection and means for biasing said collar member toward said lock nut whereby the tang and projection engage to prevent rotation therebetween.

4. Apparatus according to claim 1, wherein said engaging means on the lower end of said stopper shaft comprises a first threaded portion having a first outer diameter and threaded in a third direction, and a second threaded portion beneath said first threaded portion having a second outer diameter and threaded in a fourth direction that is opposite the third direction.

5. Apparatus according to claim 4, wherein the first outer diameter is less than the second outer diameter.

6. Apparatus according to claim 4 wherein said third direction is lefthanded and said fourth direction righthanded.

7. Apparatus according to claim 4, wherein said first and third directions are lefthanded and said second and fourth direction are righthanded.

8. An improved line stopping apparatus for use in a plastic fitting and control linkage therefor which is powered by an external drive shaft, comprising:
a stopper shaft having a second threaded portion formed at a lower end thereof and threaded in a fourth direction, a first threaded portion above said second threaded portion and threaded in a third direction that is opposite the fourth direction, and a threaded nipple portion at an upper end thereof that is threaded in a first direction so as to be adapted to engage a threaded bore in the drive shaft;
a lock nut mounted on said stopper shaft beneath said nipple and having an outer threaded portion which is threaded in a second direction opposite the first direction so as to be adapted to engage an inner threaded portion provided within a flange on the drive shaft;
means for releasably locking said stopper shaft against rotation with respect to said lock nut, whereby torque in either direction between the drive shaft and the stopper shaft will cause one of the threaded connections to tighten and the threaded portions may be disassembled by disengaging the locking means when the locking means is pushed away from the lock nut to permit the drive shaft to be unscrewed and removed from the stopper shaft;
a stopper element adapted to be inserted into the plastic fitting for bearing against the inside thereof to impede the flow of fluid therethrough;
said stopper element having a first threaded collar threadedly engaged with said first threaded portion;
a second threaded collar threadedly engaged with said second threaded portion;
first and second draw bar linkages pivotally attached to said first and second collars, respectively, at first ends thereof, and to said stopper element at second ends thereof, whereby, upon rotation of the stopper shaft the stopper element moves relative to the fitting to impede the flow of fluid therethrough.

9. Apparatus according to claim 8, wherein said stopper element is cup-shaped.

10. Apparatus according to claim 8, wherein said stopper element is provided with a sealing gasket for sealing against a surface within the fitting.

11. Apparatus according to claim 8, wherein said stopper shaft is provided with a smooth guide surface between said first and second threaded portions.

12. Apparatus according to claim 11, wherein said stopper element includes a rearwardly extending slide portion having a recess therein defined by a pair of flat guide surfaces, said guide surfaces engaging said smooth guide surface of said stopper shaft to ensure straight movement of said stopper element.

13. Apparatus according to claim 8, further comprising an alignment centering guide adapted to be inserted into the fitting and having a centering bore defined therein for aligning said stopper shaft.

14. Apparatus according to claim 8, wherein said second threaded portion has an outer diameter that is greater than an outer diameter of said first threaded portion.

15. Apparatus according to claim 8, wherein said first and third directions are lefthanded and said second and fourth directions are righthanded.

16. Apparatus according to claim 8 wherein said releasable locking means comprises at least one projection formed at a lower surface of said lock nut, a collar member that is secured against rotation with respect to said stopper shaft and has at least one upperwardly extending tang for engaging said projection and means for biasing said collar member toward said lock nut, whereby the tang and projection engage to prevent rotation therebetween.

* * * * *